: 2,882,222
Patented Apr. 14, 1959

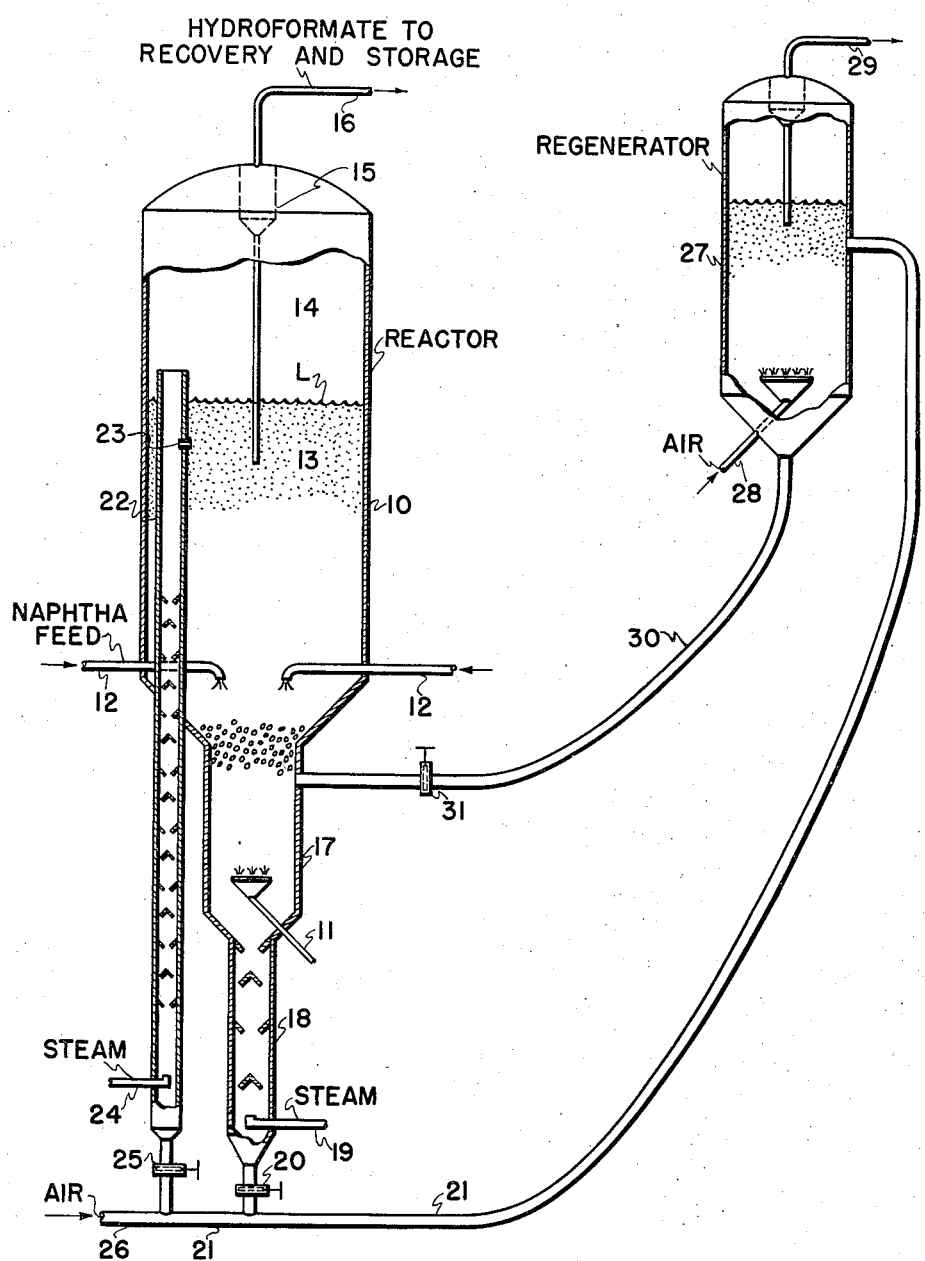

2,882,222

SHOT HEATED FLUIDIZED CATALYTIC HYDROFORMING SYSTEM

Edward Wheelock Steele Nicholson, Baton Rouge, La., assignor to Esso Research and Engineering Company, a corporation of Delaware Application December 29, 1954, Serial No. 478,406

3 Claims. (Cl. 208—149)

This invention pertains to fluid catalytic processes and particularly to fluid catalytic processes in which inert heat transfer solids or shot are circulated in the system in order to facilitate the removal of heat from an exothermic reaction zone or the supply of heat to an endothermic reaction zone or both.

The fluidized solids technique has been widely adopted for a variety of catalytic reactions, especially for the conversion of hydrocarbons as in catalytic cracking, reforming, hydroforming, and the like, because of the advantages offered thereby of continuity of operation, uniformity of temperatures in the reaction and regeneration zones, and the facility with which control of all phases of the process is achieved. An important advantage of the fluid solids technique is the fact that the catalyst can be used as a carrier of heat from the regeneration zone into the reaction zone.

It has been proposed to increase heat transfer in fluid catalytic processes by circulating inert heat transfer solids through the system along with the catalyst. This is especially useful in fluid hydroforming, since selectivity considerations require that low catalyst-to-oil ratios, generally less than 3.5 to 1 be used. Such low catalyst-to-oil ratios limit the amount of heat that can be safely transferred from the regeneration zone to the reaction zone as sensible heat in the catalyst. Since the amount of heat released in the regenerator is so much greater than the catalyst is capable of carrying back to the reactor at permissible temperatures, it is common practice to arrange cooling coils in the regenerator. This, therefore, necessitates preheating the naphtha and recycle gas to such temperatures as tend to cause thermal degradation of naphtha feed as well as of the higher molecular weight constituents of the recycle gas. By circulating inert heat transfer solids along with the catalyst it is possible to eliminate the cooling coils in the regenerator and also reduce the amount of recycle gas circulated and still achieve a heat balanced operation.

In view of the fact that the inert heat transfer solids occupy valuable reactor space, i.e., each volume of shot displaces an equal volume of catalyst from the reaction zone, several systems have been devised which in essence involve the circulation of the shot through the reaction zone at a substantially faster rate than the catalyst. In this way the total volume of shot in the reactor at any given moment can be kept fairly low, say, of the order of about one part of shot to about eight to ten parts of catalyst, while at the same time shot and catalyst are withdrawn either separately or together for circulation to the regenerator or heating zones in ratios of from about three or four parts of shot to one of catalyst to as high as eight or ten parts of shot to one of catalyst.

It has generally been proposed to discharge the hot mixture of freshly regenerated catalyst and inert, heat transfer solids or shot as withdrawn from the regenerator into the upper part of the dense fluidized bed in the reactor in order that adequate contact of the shot with the dense bed of catalyst in the reactor for complete heat transfer will be obtained. Although this necessarily has meant that the pretreatment or partial reduction of the catalytic component, for example, the reduction of $MoO_3$ to $MoO_2$ or $Mo_2O_5$ or mixtures thereof, would occur in the reactor dense bed, this was not expected to be objectionable. In fact, previous experience had indicated that introducing the freshly regenerated catalyst into the reactor without previous pretreatment had given excellent results because of the fact that optimum conditions for pretreatment, i.e., low temperatures and high ratio of hydrogen to catalyst, exist in the reactor dense bed.

It has been found, however, that when the hot mixture of freshly regenerated catalyst and shot is introduced near the top of the dense, fluidized bed in the reaction zone, appreciable product debits are incurred. This may be due to the fact that the catalyst in this case undergoes reduction in an atmosphere of hydrogen and reaction products, whereas in previous operations the unpretreated catalyst had been introduced near the bottom of the dense bed where it contacted hydrogen and feed. It is probable that some of the catalyst reduction in the reactor is brought about by reaction of the catalyst with hydrocarbons. The feed molecules are relatively easily dehydrogenated without much degradation, but the product molecules, being largely aromatics, are probably primarily degraded to gas and coke by any reaction with unpretreated catalyst. This would explain the adverse effect on product distribution of introducing unpretreated catalyst into an upper part of the reactor dense bed.

It is the object of this invention to provide an improved fluid catalytic hydroforming system employing shot to improve heat transfer.

It is also an object of this invention to provide an improved fluid catalytic hydroforming system employing shot to improve heat transfer, which will avoid incurring the appreciable product debits that have been encountered when the hot mixture of regenerated catalyst and shot or inert heat transfer solids is introduced at the top portion of the reactor dense bed.

These and other objects will appear more clearly from the detailed specification and claims which follow.

In accordance with the present invention, advantage is taken of the extremely high thermal conductivity of a fluidized bed to transfer rapidly and efficiently the heat in the incoming stream of catalyst and inert, heat transfer solids or shot to the main reactor bed. The stream of shot and catalyst from the regenerator enters a fluidized bed heat transfer zone at the bottom of the reactor. This heat transfer zone is fluidized with recycle gas so that pretreating of the regenerated catalyst also occurs in this zone. The zone is so designed with respect to diameter and height that the average temperature is only a few degrees above the average reactor temperature. This pretreating thus occurs at the optimum conditions of low temperature and high ratio of hydrogen to catalyst, since all the recycle gas can be used for pretreating. It is also designed so that the catalyst is substantially completely stripped from the shot so that a stream consisting essentially of shot is withdrawn from the bottom of the zone for recirculation to the regenerator. Catalyst is separately withdrawn from the upper part of the reactor dense bed, re-mixed with the withdrawn shot, and the mixture is then recirculated to the regenerator where carbonaceous deposits are burned from the catalyst, thereby regenerating the catalyst and simultaneously heating the shot. The hot mixture of regenerated catalyst and shot is then returned to the heat transfer zone.

Reference is made to the accompanying drawing which illustrates, diagrammatically, one system for carrying out the present invention.

In the drawing, the reactor vessel 10 is charged with a mixture of finely divided catalyst particles and inert heat transfer solids or shot. Recycle gas is supplied to the lower part of the reactor vessel 10 through inlet line 11 and preheated naphtha feed is supplied to the reactor through inlet lines 12. Gas velocities through the reactor are controlled to form a dense, fluidized bed 13 having a definite level L or interface separating it from a dilute or disperse phase 14 comprising small amounts of catalyst entrained in the vaporous reaction products in the upper part of the vessel. The reaction products pass overhead from the reactor vessel 10 through a cyclone separator 15 or the like for separating entrained catalyst and recycling to the reactor dense bed through the dip pipe attached to the base of the cyclone. Reaction products substantially free from catalyst or other solid particles are removed through product outlet line 16 to suitable product recovery, stabilizing, and/or storage equipment.

Suitable catalysts for charging to the system are metal oxides such as molybdenum oxide, chromium oxide, tungsten oxide, vanadium oxide, or the like, or mixtures thereof, preferably upon an alumina-containing support such as activated alumina, alumina gel, zinc alumina spinel, or the like. Other hydroforming catalysts such as platinum or palladium upon alumina can also be used. The catalyst particles should, for proper fluidization, be between about 200 to 400 mesh or about 10 to 200 microns in diameter with a major proportion between about 20 and 100 microns.

The inert heat transfer solids or shot are preferably coarser and/or of greater density than the catalyst used in the process. Suitable materials include particles of metals such as stainless steel and Monel, corundum, mullite, fused alumina, fused silica, or the like. It is necessary that the heat transfer solids have no adverse effect upon the hydroforming process and that they be stable or resistant to breakdown due to the thermal and physical forces to which they are subjected in the process. The size of the heat transfer solids may vary from about 200 to 2000 and are preferably about 500 to 1000 microns in diameter and also are preferably in the shape of spherical or spheroidal particles.

Because of the fact that the shot particles are larger and have a greater density than the catalyst, when the mixture is recycled to the heat transfer zone 17 at the bottom of the main reaction zone, the shot particles tend to settle downwardly through the heat transfer zone 17 into stripping zone 18. The catalyst particles, however, are entrained by the recycle gas introduced through line 11 and carried into dense bed 13. This recycle gas also serves simultaneously to pretreat the regenerated catalyst particles, and this pretreatment is carried out under the optimum conditions of low temperature and maximum ratio of hydrogen to catalyst since all the recycle gas can be introduced through line 11. The temperature of the shot-catalyst mixture in zone 17 can be maintained only slightly higher than that in dense bed 13 because of the very high "thermal conductivity" of fluidized solids beds. Apparently heat is transferred extremely efficiently in fluidized beds of convection, by conduction and by mass movement of the particles. For convection, heat transfer between solids and gas is very efficient because of the extraordinarily large amount of surface of the fluidized particles. A large amount of heat is also transferred by conduction from one particle to another during the innumerable collisions of the individual particles. Finally, considerable heat is transferred from one part of the coarse solids bed in zone 17 to another by the movement of coarse solids particles within this bed. Thus the heat brought in with the hot shot from the regenerator can be efficiently transferred to the dense bed 13 without actually passing an appreciable amount of the hot shot up into or through this dense bed 13. Shot, substantially free of catalyst is discharged from the bottom of heat transfer zone 17 into stripper section 18 where it is contacted with a stripping gas such as steam supplied through inlet line 19. The stripped shot is then discharged through slide valve 20 into transfer line 21.

A conduit 22 for the withdrawal of catalyst extends upwardly in the reactor vessel 10 to above the level L of dense bed 13. A restriction orifice or port 23 is provided for controlling the discharge of catalyst from the upper part of dense bed 13 into conduit 22. In this way, substantially pure catalyst is withdrawn from bed 13 into conduit 22 for transfer to the regeneration zone. Stripping gas such as steam is introduced at the bottom of conduit 22 through inlet 24 to strip off adsorbed or entrained hydrogen or hydrocarbons which are discharged into disperse phase 14 for recovery with the reaction products. Stripped catalyst is discharged from conduit 22 through slide valve 25 into transfer line 21 where it is picked up by a stream of air supplied through line 26 for recirculation to regenerator 27.

The slide valves 20 and 25 are set to discharge shot and catalyst into transfer line 21 in the desired ratio for recirculation to regenerator 27. The shot/catalyst ratio is, preferably, at least three. The catalyst and shot are carried by a stream of air through transfer line 21 into regenerator 27 where inactivating carbonaceous deposits are burned off, regenerating the catalyst particles and heating the catalyst and shot to regenerator temperatures. Additional air for regeneration is supplied through line 28. The regeneration gases, substantially free of catalyst or solid particles pass overhead through outlet line 29 to a waste gas stack, a waste heat boiler or to suitable scrubbing and storage equipment. The hot, regenerated catalyst and shot are withdrawn from the bottom of the regenerator and recycled to the reactor through conduit 30 and slide valve 31 without contact with hydrogen or other reducing gas prior to discharge from conduit 30 into the heat transfer zone 17.

The hot mixture of freshly regenerated catalyst and shot is discharged from conduit 30 into the upper part of heat transfer zone 17. Recycle gas, or gas rich in hydrogen supplied through inlet 11 contacts the regenerated catalyst and effects a partial reduction of catalytic metal oxides and simultaneously provides the fluidization of zone 17 which enables efficient transfer of heat to the fluid bed 13.

The feed or charging stock to the reactor in a hydroforming operation may be a virgin-, cracked- or Fischer-Tropsch naphtha or the like having a boiling range of from about 125–450° F., or it may be a narrow boiling cut from within this range. The feed stock is preheated to about reaction temperature and supplied to the reaction zone. Recycle gas is preheated to temperatures of up to about 1200° F. and introduced or circulated through the reaction zone at rates of from about 500 to 6000 cu. ft. per barrel of feed.

The hydroforming reactor vessel is operated at about 900–950° F. and at pressures of about 50 to 1000, preferably about 200 lbs. per sq. inch. In the case of molybdenum oxide on alumina catalysts it is desirable to maintain a water partial pressure of about 0.1 to 3.0 mol percent in the reaction zone.

The regenerator is operated at essentially the same pressure as the hydroforming reactor vessel and at temperatures of about 1000–1200° F. or low enough to avoid thermal degradation of the catalyst. The average residence time of the catalyst in the reactor is of the order of from about 1 to 4 hours and in the regenerator of from about 3 to 15 minutes. The average residence time of the heat transfer solids or shot in the reaction zone is of the order of from about 3 to 20 minutes and in the regenerator it may be about 3 to 15 minutes, i.e. coextensive with the residence time of the catalyst or it may be held for longer or shorter times than the catalyst.

The weight ratio of catalyst to oil introduced into the reactor should ordinarily be about 0.5 to 3.5. Space velocities or the weight in pounds of feed charged per hour per pound of catalyst in the reactor depends upon the age or activity level of the catalyst, the character of the feed stock and the desired octane number of the product. Space velocity for a molybdic oxide on alumina gel catalyst may vary from about 1.5 to about 0.15 w./hr./w.

The following example is illustrative of a hydroforming process carried out in accordance with the present invention. A 200–350° F. virgin naphtha having a Research clear octane number of 45 to 50 is hydroformed to yield a product gasoline of 95 to 100 Research clear octane number. A catalyst consisting of about 10% $MoO_3$ on an activated alumina is used, and the inert heat transfer solids are microspheroidal mullite particles of 400–800 microns' diameter. The system pressure is about 200 lb./sq. in. The reactor dense bed 13 is held at about 900° F., and the regenerator 27 is held at a temperature of about 1125° F.

The catalyst is circulated through the system at a rate of about 0.5 lb. per lb. of naphtha fed to the reactor, and the inert solids are circulated at a rate of about 5 lb. per lb. of naphtha feed. These are therefore also the rates at which these solids enter heat transfer section 17, and the temperature of these solids entering 17 is about that existing in the regenerator, 1125° F. Recycle gas at a rate of about 2000 cu. ft. per barrel of naphtha feed is introduced through line 11 at a temperature of about 1000° F. The diameter of the heat transfer zone 17 is designed so that the velocity of the recycle gas rising through this zone is below the minimum fluidizing velocity of the inert solids so that catalyst will be efficiently removed from the inert solids and carried into dense bed 13. On the other hand, it is desirable to have the diameter of this section 17 as large as practicable in order to have a larage area for transfer of heat from zone 17 to dense bed 13. Hence, ordinarily the heat transfer zone 17 is designed for a velocity of 0.6 to 1.5 ft./sec. It is also designed to have as short as possible a distance from the point of introduction of regenerated catalyst and inert solids to the bottom of dense bed 13. In general, this distance is held at about 1 to 2 feet. It is desirable to hold the interface between the catalyst in dense bed 13 and the inert solids in zone 17 within the conical section connecting these two zones to provide maximum heat transfer area and good conditions for separating catalyst from the inert solids. Under these conditions, the temperature in zone 17 will be about 950 to 1000° F., or 50 to 100° F. above the temperature in dense bed 13. This temperature range is satisfactory for obtaining good pretreating of the catalyst.

The foregoing descrpition contains a limited number of embodiments of this invention. It will be understood that this invention is not limited thereto without departing from the scope of this invention.

What is claimed is:

1. A method of hydroforming which comprises contacting vapors of hydrocarbons boiling in the naphtha range and hydrogen rich gas with a dense, fluidized bed consisting essentially of finely divided hydroforming catalyst particles in a reaction zone maintained at hydroforming reaction conditions of temperature, pressure and contact time, maintaining a bed consisting essentially of inert heat transfer solids in a heat transfer zone at the bottom of and in contact with the said dense fluidized bed of catalyst, withdrawing substantially pure shot from the bottom of the heat transfer zone, withdrawing substantially pure catalyst from the upper part of the dense catalyst bed in said reaction zone, mixing the withdrawn shot and catalyst and transferring the mixture to a regeneration zone where carbonaceous deposits are burned off the catalyst and the shot particles are heated, withdrawing heated shot and regenerated catalyst from the regeneration zone, discharging the heated shot and regenerated catalyst into the upper portion of said heat transfer zone and passing recycle gas upwardly through said heat transfer zone at a velocity sufficient to effect heat transfer between the bed of shot in the heat transfer zone and the catalyst in the reaction zone and to entrain the freshly regenerated catalyst from the heat transfer zone into the main reaction zone.

2. The method as defined in claim 1 in which the weight ratio of shot withdrawn from the heat transfer zone to catalyst withdrawn from the reactor dense bed for circulation to the regeneration zone and recycling to the reactor vessel is at least three.

3. The method as defined in claim 2 in which all of the hydrogen-rich gas is supplied to the bottom of the heat transfer zone and vaporized naphtha feed is supplied to the lower portion of the dense bed of catalyst particles in the reaction zone.

References Cited in the file of this patent
UNITED STATES PATENTS

| | | |
|---|---|---|
| 2,393,636 | Johnson | Jan. 29, 1946 |
| 2,446,247 | Scheineman | Aug. 3, 1948 |
| 2,656,304 | McPherson et al. | Oct. 30, 1953 |
| 2,725,341 | Goronowski et al. | Nov. 29, 1955 |
| 2,736,687 | Burnside et al. | Feb. 28, 1956 |
| 2,763,595 | Fritz | Sept. 18, 1956 |
| 2,763,597 | Martin et al. | Sept. 18, 1956 |